(12) United States Patent
Hanschek et al.

(10) Patent No.: US 10,435,000 B2
(45) Date of Patent: Oct. 8, 2019

(54) GUIDE RING OF A PISTON PUMP FOR A VEHICLE BRAKE SYSTEM

(71) Applicant: Robert Bosch GmbH, Stuttgart (DE)

(72) Inventors: Franz Hanschek, Markgroeningen (DE); Harald Hermann, Friolzheim (DE); Oliver Gaertner, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 127 days.

(21) Appl. No.: 15/486,045

(22) Filed: Apr. 12, 2017

(65) Prior Publication Data

US 2017/0313292 A1    Nov. 2, 2017

(30) Foreign Application Priority Data

Apr. 20, 2016  (DE) .................. 10 2016 207 340

(51) Int. Cl.
| | |
|---|---|
| *B60T 11/236* | (2006.01) |
| *B60T 17/02* | (2006.01) |
| *F04B 53/14* | (2006.01) |
| *B60T 8/40* | (2006.01) |
| *F16J 15/56* | (2006.01) |

(52) U.S. Cl.
CPC .......... *B60T 11/236* (2013.01); *B60T 8/4031* (2013.01); *B60T 17/02* (2013.01); *F04B 53/146* (2013.01); *F16J 15/56* (2013.01)

(58) Field of Classification Search
CPC ...... F16J 15/32; F16J 15/3204; F04B 53/146; B60T 11/236
See application file for complete search history.

(56) References Cited

U.S. PATENT DOCUMENTS

| | | | |
|---|---|---|---|
| 3,516,760 A * | 6/1970 | Dettinger | F04B 53/164 |
| | | | 92/154 |
| 6,171,083 B1 * | 1/2001 | Schuller | F04B 53/166 |
| | | | 92/171.1 |
| 6,514,056 B1 * | 2/2003 | Schuller | F04B 53/121 |
| | | | 417/470 |

FOREIGN PATENT DOCUMENTS

| | | |
|---|---|---|
| CN | 2504404 Y | 8/2002 |
| CN | 102138002 A | 7/2011 |

* cited by examiner

*Primary Examiner* — Michael Leslie
(74) *Attorney, Agent, or Firm* — Maginot, Moore & Beck LLP

(57) ABSTRACT

A guide ring for a piston pump of a vehicle brake system includes a body and a seal. The body is configured to movably support a piston of the piston pump in a cylinder liner. The seal is held on the guide ring and configured to inhibit passage of air between the piston and the guide ring during movement of the piston.

17 Claims, 5 Drawing Sheets

GUIDE RING OF A PISTON PUMP FOR A VEHICLE BRAKE SYSTEM

This application claims priority under 35 U.S.C. § 119 to patent application no. DE 10 2016 207 340.0, filed on Apr. 29, 2016 in Germany, the disclosure of which is incorporated herein by reference in its entirety.

FIELD OF INVENTION

The disclosure relates to a guide ring of a piston pump for a vehicle brake system, in which a piston of the piston pump for a vehicle brake system is supported movably in a cylinder liner of the piston pump for a vehicle brake system by means of the guide ring.

BACKGROUND

A vehicle, in particular a passenger vehicle, is generally equipped with a vehicle brake system that has at least one wheel brake for braking a wheel of said vehicle. In this context, the wheel brake is often of hydraulic design and receives a flow of a fluid or brake fluid, which is contained within a fluid line. A hydraulic unit inserted in the fluid line pressurizes the fluid by means of a pump, usually by means of a piston pump for a vehicle brake system having a piston capable of rectilinear movement. During the movement, the piston is guided in a cylinder liner by means of a guide ring. During the movement, the piston performs a guided backward and forward movement within the guide ring.

During the backward and forward movement, the piston enters and exits from a pressure piston, in which the fluid is contained. At the same time, there is air acting on the piston outside said pressure chamber, in particular in a drive chamber for driving the movement of the piston. In this case, the fluid is at least temporarily under high pressure, while the air is under the usual air pressure of the environment.

SUMMARY

According to the disclosure, a guide ring of a piston pump for a vehicle brake system is provided in which a piston of the piston pump for a vehicle brake system is supported movably in a cylinder liner of the piston pump for a vehicle brake system by means of the guide ring. In this arrangement, a seal, by means of which the passage of air between the piston and the guide ring is prevented during movement of the piston, is held on the guide ring.

In previous piston pumps for vehicle brake systems, a sealing ring is formed between the cylinder liner and the piston. This sealing ring is arranged as a separate component in addition to the guide ring by means of which the piston is guided. This sealing ring forms a seal between the piston and the cylinder liner against the passage of liquid and, at the same time, against the passage of air. The effect of these two functions of this known sealing ring against the passage of liquid and against the passage of air is that the sealing ring cannot be matched in an optimum manner to the respective individual function and that compromises have to be made as regards the requirement for sealing against the passage of liquid and sealing against the passage of air.

According to the disclosure, on the other hand, a seal is deliberately attached to or held on a guide ring. This seal specifically prevents air from flowing through between the piston and the guide ring, which would otherwise be possible. Thus, the seal spans or closes an interspace between the guide ring and the piston against the passage of air. For this purpose, the seal on the guide ring according to the disclosure rests against the piston, and the piston slides past the seal during its movement. By virtue of the fact that the seal of this kind forms a seal between the guide ring and the piston, a tendency for the passage of air even to arise at a sealing ring arranged adjacent thereto is prevented, in particular. More particularly, it is thereby possible to match and optimize said sealing ring specifically to a sealing function as a liquid seal. Thus, the solution according to the disclosure not only separates the two sealing functions of sealing against the passage of liquid and against the passage of air but furthermore transfers the process of sealing against the passage of air to the guide ring. The guide ring simultaneously assumes an additional function. Thus, this sealing against air by means of the guide ring advantageously takes place on the side of the piston on which the air-filled drive chamber is also situated.

The seal according to the disclosure is advantageously formed by means of a flexible plastic, in particular an elastomer. The seal is preferably joined to the guide ring by means of an injection molding process. In an injection molding process, plastic is liquefied and injected under pressure into a mold. Particularly in the case of a guide ring, which is already composed of plastic, it is advantageously possible, by means of an injection molding process, to mold on a seal composed of a different plastic. It is thereby possible to produce a material connection between the guide ring and the seal. Here, the guide ring is preferably produced from a harder plastic than the seal, which is then embodied from a softer flexible plastic. With the seal, the guide ring thus forms a unit which can be installed in a single installation step.

As an alternative, the seal is advantageously press-fitted on the guide ring. Press-fitting the seal on the guide ring imposes on the seal a compressive force which deforms said seal. The deformation counteracts a restoring force of the seal, by means of which the seal is pressed and nonpositively held against the guide ring. The guide ring furthermore advantageously has an undercut, in which the seal can be fixed positively in addition or as an alternative to a nonpositive joint. Another advantage of a press-fitted seal is that such a seal can be preinstalled on the associated guide ring and is exchangeable.

An annular recess, in which the seal is inserted, is furthermore preferably formed in the guide ring, wherein, in particular, the recess is designed as a step-shaped chamfer. During preassembly, the seal can be inserted and, in particular, press-fitted easily into the annular recess. In particular, the recess is embodied as a partial negative form of the inserted seal. In the case of a seal inserted in this way, a combination of nonpositive engagement and positive engagement is then preferably employed.

Preferably, the piston can furthermore be moved into a pressure chamber for a pressure buildup, and the seal is arranged on that side of the guide ring which faces away from the pressure chamber. A pressure buildup in the pressure chamber is then performed by means of the piston. As it moves into the pressure chamber, the piston displaces a fluid contained therein out of the pressure chamber. During this process, the pressure in the pressure chamber increases. As the piston is retracted from the pressure chamber, a vacuum furthermore forms there. The vacuum has the tendency to make air flow along the piston into the pressure chamber. Since the seal according to the disclosure is arranged on that side of the guide ring which faces away from the pressure chamber, the seal is forced against the piston by the air owing to this tendency for air to flow in along the piston. Improved sealing is thereby achieved. This also prevents air from already penetrating into the gap, situated behind it, between the piston and the guide ring. The assembly is thus advantageously sealed by means of the seal on its side of the guide ring facing away from the pressure chamber.

As a preferred option according to the disclosure, the seal is furthermore embodied with at least one sealing lip, which rests against the piston and extends substantially in the axial direction thereof in the installed state. In the installed state, the sealing lip hugs the piston by means of a longitudinal side facing the piston. In this case, the sealing lip extends in an axial direction virtually parallel to the piston. During the backward and forward movement of the piston, the sealing lip slides by means of the longitudinal side facing the piston along the surface of the piston. Advantageously according to the disclosure, the contact of the sealing lip prevents the sealing lip from tilting during the backward and forward movement of the piston and thus reduces mechanical stress on the sealing lip. Since, advantageously according to the disclosure, the sealing lip rests by means of its longitudinal side on the piston, the wear on the associated tip of the sealing lip is also low. In addition, the sealing lip advantageously compensates, as a kind of spring, for a possible movement of the piston in a radial direction.

The seal is furthermore preferably embodied with an annular sealing element, and the sealing lip is arranged on that side of the sealing element which faces away from the pressure chamber. A seal in the form of a ring surrounds the piston, which is cylindrical in this case, and seals it over its entire circumference. As explained above, arranging the sealing lip on the side facing away from the pressure chamber has the effect that a contact pressure acts on the sealing lip by means of air pressure. This contact pressure forces the sealing lip against the surface of the piston. Advantageously according to the disclosure, the sealing effect of the sealing lip is increased by means of the contact pressure.

The seal is furthermore advantageously embodied with an annular sealing element, and the inside diameter of the sealing element is smaller in the uninstalled state of the piston than the outside diameter of the piston. A smaller inside diameter of the sealing element than the outside diameter of the piston has the effect that, during the installation of the piston, the sealing element, which is flexible in this case, is forced outward by the piston at the inside. Since the flexible sealing element tends to retain its original shape, the sealing element presses against the piston on the inside. Advantageously according to the disclosure, a sealing surface is formed between the piston and the sealing element. As a particularly advantageous characteristic, the sealing element is embodied with a convex surface segment toward the piston. By means of the convex surface segment curved toward the piston, the contact pressure in the sealing element is lower at both axial ends of the surface segment than in the center. In this way, sliding of the piston on the sealing element during a backward and forward movement of the piston is made easier in a particularly advantageous manner. As an alternative to the convex surface segment, the sealing element is embodied with a concave surface segment there. Advantageously according to the disclosure, the ends of the surface segment are then forced axially outward in the installed state of the piston and thus enlarge the sealing surface of the sealing element.

The seal according to the disclosure is preferably embodied by means of an elastomer which has an elasticity modulus of from 0.30 to 30.00 N/mm$^2$, preferably of from 5.00 to 25.00 N/mm$^2$, particularly preferably of from 10.00 to 15.00 N/mm$^2$. It has been found that, in the present case a seal with this elasticity modulus has a particularly advantageous sealing effect with respect to air. The abovementioned elasticity modulus has the advantage that the seal hugs the piston particularly well. At the same time, it does not excessively hinder a backward and forward movement of the piston owing to friction between the seal and the piston. In particular, the seal is preferably embodied from the material EPDM.

The disclosure is furthermore also directed to a use of a guide ring according to the disclosure in a piston pump for a vehicle brake system. In the case of such a use, the abovementioned advantages are obtained.

BRIEF DESCRIPTION OF THE DRAWINGS

Illustrative embodiments of the solution according to the disclosure are explained in greater detail below with reference to the attached schematic drawings, in which.

There are shown in.

DETAILED DESCRIPTION

Figure 1:
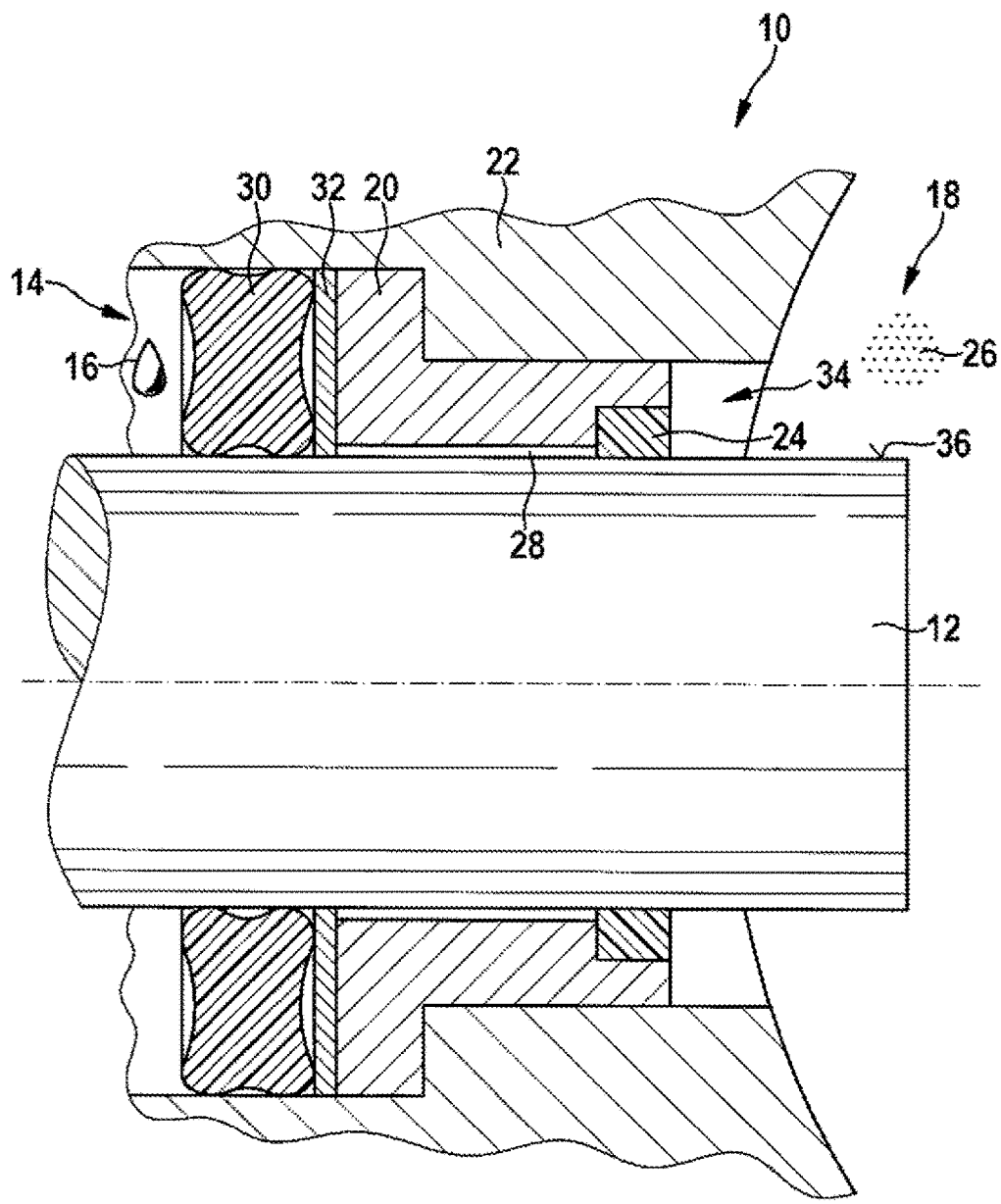
FIG. 1 shows a partial longitudinal section through a piston pump for a vehicle brake system, having a first illustrative embodiment of a guide ring according to the disclosure with a seal.

FIG. 1 shows part of a piston pump 10 for a vehicle brake system, said pump being used to produce hydraulic pressure at wheel brakes of a vehicle. The pressure is produced by means of the piston pump 10 for a vehicle brake system in that a piston 12 moves into a pressure chamber 14 and, in the process, subjects a liquid 16 to excess pressure relative to the environment. The movement of the piston 12 is produced by means of an eccentric drive in an eccentric chamber 18. In this case, the eccentric drive converts a rotary motion of a drive shaft into a translational motion of the piston 12. After this driven movement into the pressure chamber 14, the piston 12 is forced back out of the pressure chamber 14 by means of a spring. During this return movement of the piston 12, a vacuum forms in the pressure chamber 14 relative to the environment and relative to the pressure in the eccentric chamber 18.

During its backward and forward movement, the piston 12 is guided in a cylinder liner 22 of the piston pump 10 for a vehicle brake system by means of a guide ring 20 of L-shaped cross section. The guide ring 20 is inserted with an accurate fit at the outside into the cylinder liner 22 and, on the inside, surrounds the piston 12 in a ring shape. At the same time, a narrow gap in the form of an annular interspace 28 remains between the outside of the piston 12 and the inside of the guide ring 20.

A seal 24 is arranged on the guide ring 20 on the side facing the eccentric chamber 18. The seal 24 is used to prevent air 26 from flowing from the eccentric chamber 18 into the interspace 28. Thus, the seal 24 spans or closes the interspace 28 between the guide ring 20 and the piston 12 with respect to the eccentric chamber 18. The seal 24 of this kind is simultaneously used to prevent air from reaching the pressure chamber 14 from the eccentric chamber 18, especially when the piston 12 is moved out of the pressure chamber 14 and a vacuum arises in said chamber.

In the axial direction of the piston 12, a flexible sealing ring 30 of substantially H-shaped cross section is arranged between the cylinder liner 22 and the piston 12 on that side of the guide ring 20 which faces the pressure chamber 14. On this sealing ring 30, each of the edge regions is rounded.

In this arrangement, there is also a disk-shaped, radially oriented backing ring 32 between the guide ring 20 and the sealing ring 30. On the outside, the backing ring 32 extends as far as the cylinder liner 22 and, on the inside, it extends as far as the piston 12 and thereby prevents wear on the sealing ring 30 in the edge regions thereof facing the guide ring 20.

The sealing ring 30 separates the liquid 16 contained in the pressure chamber 14 from the guide ring 20 and from the eccentric chamber 18 in a manner known per se, especially when the piston 12 is moved into the pressure chamber 14 and a vacuum arises in said chamber.

Thus, the interspace 28 is delimited with respect to the eccentric chamber 18 by means of the seal 24 and, at the same time, with respect to the pressure chamber 14 by means of the sealing ring 30. In this way, the tasks of sealing against air passing out of the eccentric chamber 18 into the pressure chamber 14 and of sealing against liquid passing out of the pressure chamber 14 into the eccentric chamber 18 are separated from one another at the guide ring 20. Overall, a particularly advantageous sealing assembly is thereby created.

According to FIG. 1, the guide ring 20 has a recess 34 of rectangular cross section on the side facing away from the pressure chamber 14 and facing the eccentric chamber 18. The recess 34 faces the piston 12 and forms a step-shaped chamfer, into which the seal 24 is press-fitted as an annular sealing element that can be installed separately. Like the sealing ring 30, the seal 24 here rests on an outside 36 of the piston 12. As an alternative, the seal 24 is molded into said recess 34 and onto the guide ring 20 so as to be fixed thereon by means of an injection molding process.

FIGS. 2 to 5 show variants of the seal 24, in each case in cross section. The seals 24 shown can each be press-fitted into the recess 34 of the guide ring 20 or molded on by means of an injection molding process. In FIGS. 2 to 5, the seals 24 are in each case shown before installation in the associated assembly. In particular, therefore, the seals 24 are shown without deformation relative to the piston 12, which is then adjacent thereto. The outside 36 of the piston 12 is in each case illustrated by a dashed line 38 in FIGS. 2 to 5 for the installed state of the seals 24.

Figure 2:
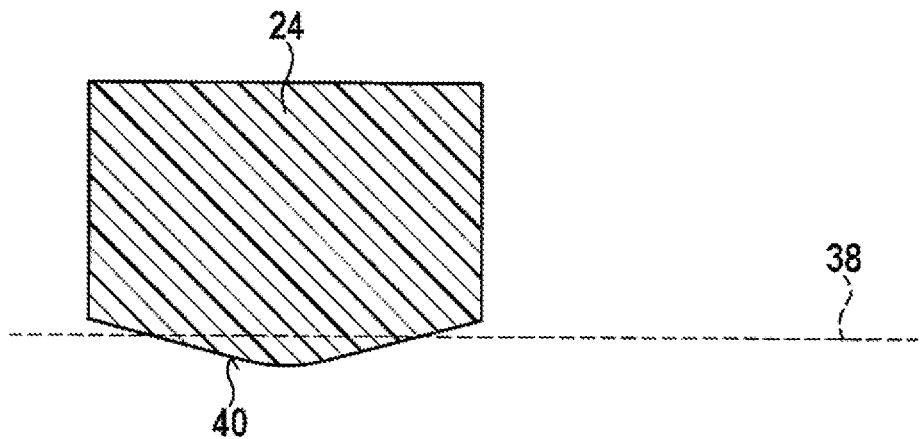
FIG. 2 shows a detail of a first variant of the seal shown in FIG. 1.

FIG. 2 shows a seal 24 of substantially rectangular cross section with straight lateral edges. The seal 24 has a seal surface 40 in the direction of the piston 12. The seal surface 40 is embodied as a surface which is curved convexly outward in cross section. According to FIG. 3, the seal 24 shown there is embodied at the seal surface 40 as a surface which is curved concavely inward in cross section. During installation on the piston 12, the seal is compressed in the region of the seal surface 40. In the installed state of the piston 12, the compressed seal 24 then hugs the piston 12, preferably completely, by means of its seal surface 40, as shown in FIG. 1.

Figure 4:
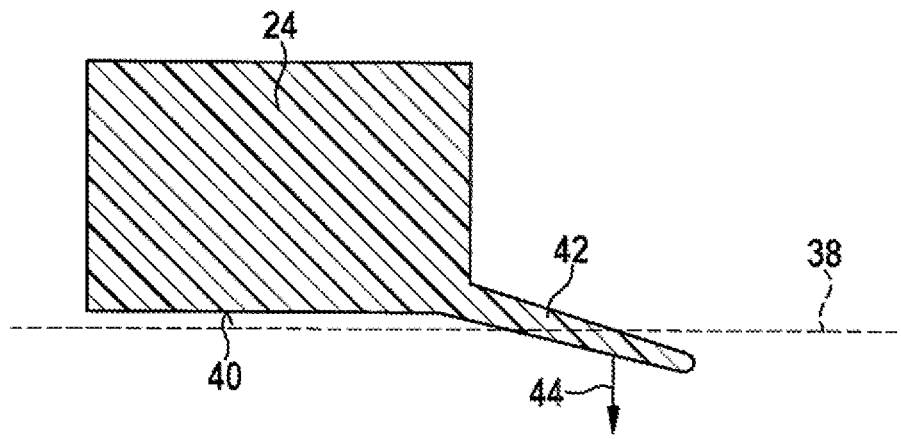
FIG. 4 shows a detail of a third variant of the seal shown in FIG. 1.

FIG. 4 shows a seal 24 on which a sealing lip 42 is integrally molded. The sealing lip 42 is formed on the seal 24 on the edge facing the eccentric chamber 18 and the piston 12 and, in cross section, extends substantially axially into the eccentric chamber 18. During installation of the seal 24, the sealing lip 42 is placed against the piston 12 and, during this process, is aligned in a fully axial orientation. Owing to its elastic restoring force 44, the sealing lip 42 then hugs the outside 36 of the piston 12 by means of its lateral surface, which is at the bottom in FIG. 4.

Figure 3:
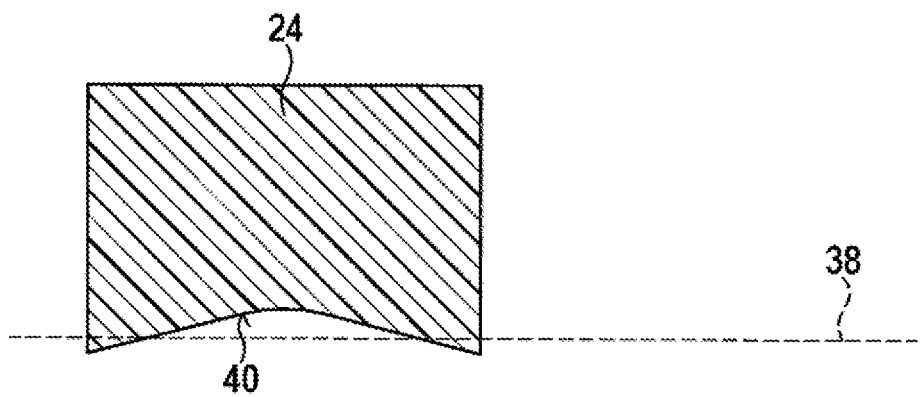
FIG. 3 shows a detail of a second variant of the seal shown in FIG. 1.
Figure 5:
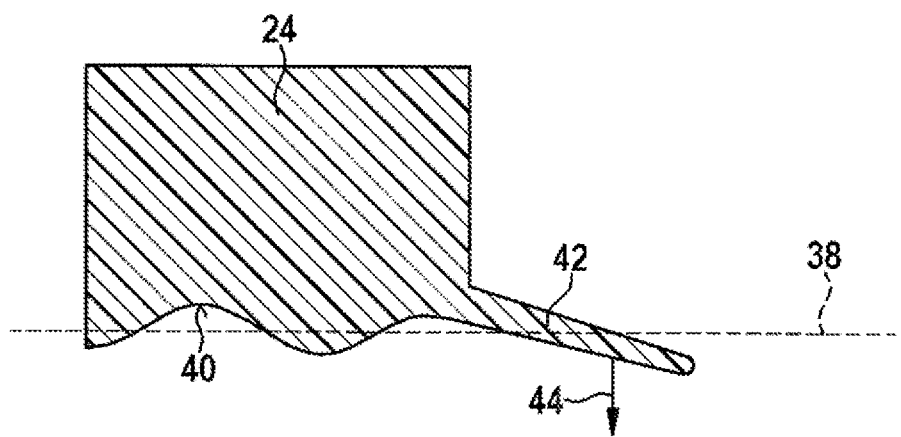
FIG. 5 shows a detail of a fourth variant of the seal shown in FIG. 1.

In addition, the seal 24 can be designed in such a way that, as shown in FIGS. 2 and 3, it also hugs the outside 36 of the piston 12 by means of its seal surface 40. FIG. 5 shows a variant thereof, in which the seal surface 40 is embodied as an undulating surface in cross section.

Figure 6:
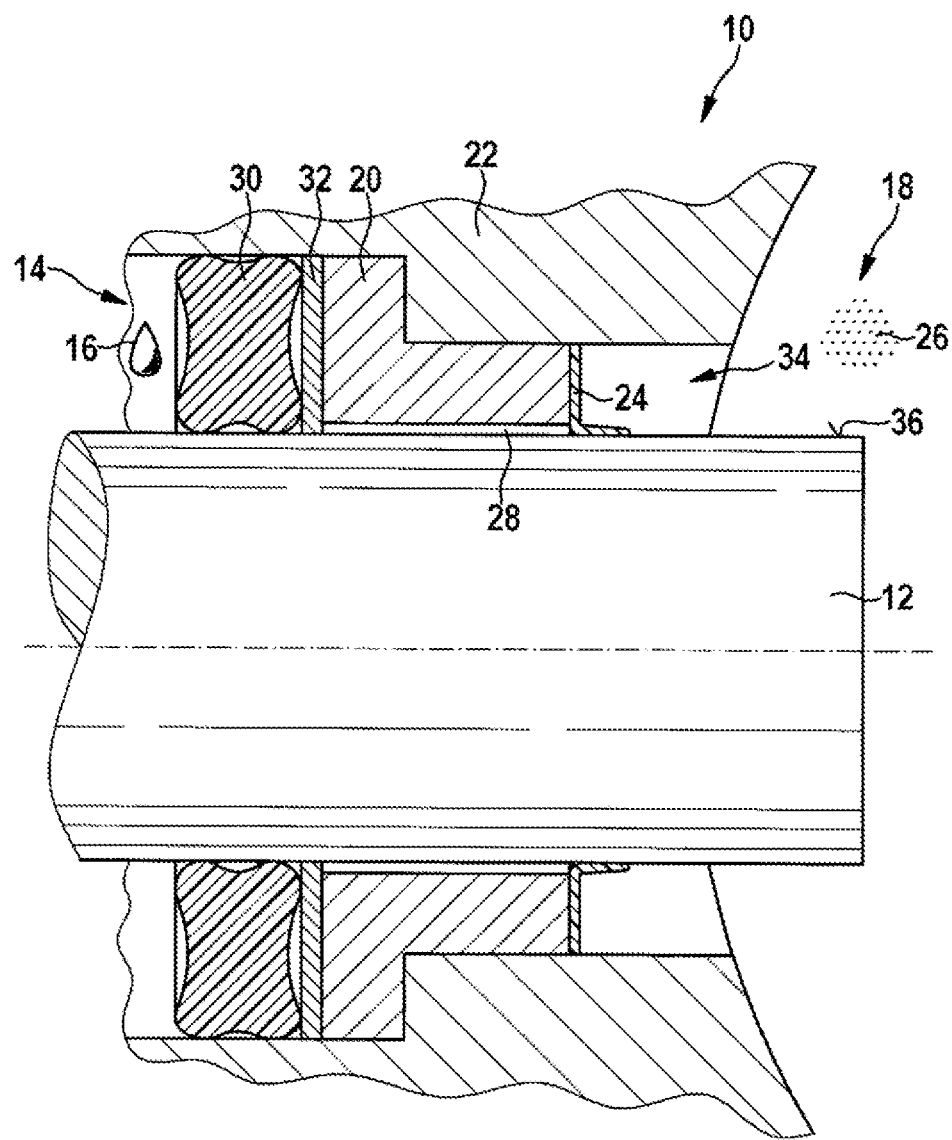
FIG. 6 shows a partial longitudinal section through a piston pump for a vehicle brake system, having a second illustrative embodiment of a guide ring according to the disclosure with a seal.

FIG. 6 shows another illustrative embodiment of a piston pump 10 for a vehicle brake system. There, the associated guide ring 20 does not have a recess 34. On the contrary, the associated seal 24 is of L-shaped cross section and one leg of its L shape, the radially oriented leg, is molded directly, in a fixed manner, onto the guide ring 20 by means of an injection molding process at that end of the guide ring 20 which faces the eccentric chamber 18. The second, axially oriented leg of the L shape forms a sealing lip 42 which, like the sealing lip shown in FIGS. 4 and 5, comes to rest against the outside 36 of the piston 12.

Figure 7:
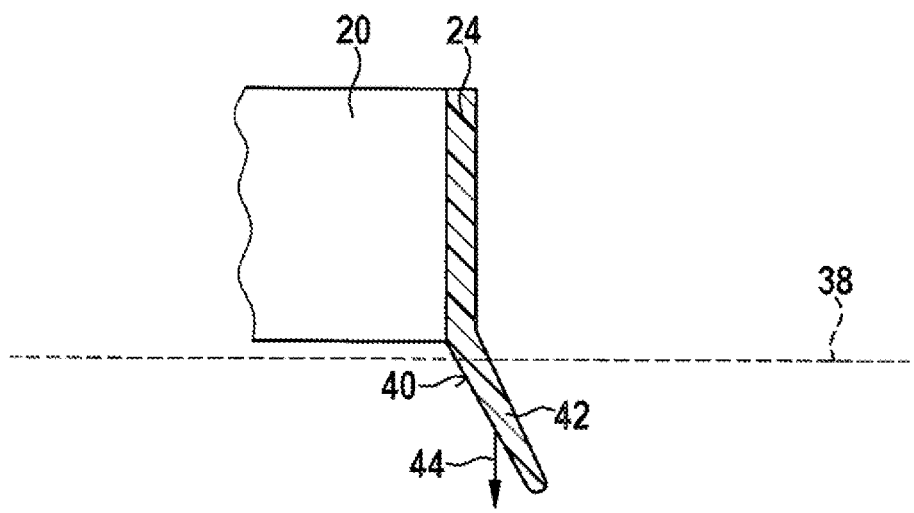
FIG. 7 shows a detail of the seal shown in FIG. 6.

FIG. 7 illustrates how the seal 24 of this kind appears in the uninstalled state. In cross section, the sealing lip 42 of the seal 24 then extends slightly obliquely inward in a radial direction, with the result that, after installation, it likewise gives rise to a restoring force 44 acting against the outside 36 of the piston 12 owing to its elasticity.

What is claimed is:

1. A guide ring for a piston pump of a vehicle brake system, comprising:
    a body configured to movably support a piston of the piston pump in a cylinder liner such that an annular interspace is formed between the piston and the body; wherein:
    the annular interspace is delimited by a seal and a sealing ring,
    the seal is arranged at a first end of the guide ring and is configured to inhibit passage of air between the piston and the guide ring during movement of the piston;
    the sealing ring is arranged beside a second end of the guide ring and is configured to inhibit passage of fluid between the piston and the guide ring during movement of the piston; and
    the seal is arranged such that an end face of the seal is coplanar with an end face of the first end of the guide ring.

2. The guide ring as claimed in claim 1, wherein the seal is joined to the guide ring via an injection molding connection.

3. The guide ring as claimed in claim 1, wherein the seal is configured so as to press-fit with the guide ring.

4. The guide ring as claimed in claim 1, wherein the guide ring defines an annular recess that includes a step-shaped chamfer and that receives the seal.

5. The guide ring as claimed in claim 1, wherein:
    the first end of the guide ring is arranged to face away from a pressure chamber of the piston pump that will undergo a pressure increase in response to the piston moving into the pressure chamber.

6. The guide ring as claimed in claim 1, wherein:
the seal includes at least one sealing lip configured to contact the piston; and
in an installed state of the guide ring, the at least one sealing lip extends in an axial direction.

7. The guide ring as claimed in claim 6, wherein:
the seal further includes an annular sealing element; and
the at least one sealing lip is disposed on a side of the annular sealing element.

8. The guide ring as claimed in claim 1, wherein:
the seal includes an annular sealing element having an inner surface; and
in an uninstalled state of the guide ring, a diameter of the inner surface of the annular sealing element is smaller than a diameter of the piston.

9. The guide ring as claimed in claim 1, wherein the seal includes an elastomer having an elasticity modulus in a range from 0.30 to 30.00 N/mm$^2$.

10. A guide ring for a piston pump of a vehicle brake system, comprising:
a body configured to movably support a piston of the piston pump in a cylinder liner such that an annular interspace is formed between the piston and the body; wherein:
the annular interspace is delimited by a seal and a sealing ring,
the seal is arranged at a first end of the guide ring and is configured to inhibit passage of air between the piston and the guide ring during movement of the piston;
the sealing ring is arranged beside a second end of the guide ring and is configured to inhibit passage of fluid between the piston and the guide ring during movement of the piston; and
the seal is arranged such that at least a portion of the seal extends beyond an end face of the first end of the guide ring in the direction away from the second end of the guide ring.

11. The guide ring as claimed in claim 10, wherein the seal is joined to the guide ring via an injection molding connection.

12. The guide ring as claimed in claim 10, wherein the seal is configured so as to press-fit with the guide ring.

13. The guide ring as claimed in claim 10, wherein:
the first end of the guide ring is arranged to face away from a pressure chamber of the piston pump that will undergo a pressure increase in response to the piston moving into the pressure chamber.

14. The guide ring as claimed in claim 10, wherein:
the seal includes at least one sealing lip configured to contact the piston; and
in an installed state of the guide ring, the at least one sealing lip extends in an axial direction.

15. The guide ring as claimed in claim 14, wherein:
the seal further includes an annular sealing element; and
the at least one sealing lip is disposed on a side of the annular sealing element.

16. The guide ring as claimed in claim 10, wherein:
the seal includes an annular sealing element having an inner surface; and
in an uninstalled state of the guide ring, a diameter of the inner surface of the annular sealing element is smaller than a diameter of the piston.

17. The guide ring as claimed in claim 10, wherein the seal includes an elastomer having an elasticity modulus in a range from 0.30 to 30.00 N/mm$^2$.

* * * * *

UNITED STATES PATENT AND TRADEMARK OFFICE
CERTIFICATE OF CORRECTION

PATENT NO. : 10,435,000 B2  
APPLICATION NO. : 15/486045  
DATED : October 8, 2019  
INVENTOR(S) : Franz Hanschek et al.

Page 1 of 1

It is certified that error appears in the above-identified patent and that said Letters Patent is hereby corrected as shown below:

On the Title Page

At "(30) Foreign Application Priority Date"  
Replace "Apr. 20, 2016" with --Apr. 29, 2016--

Signed and Sealed this  
Twenty-first Day of January, 2020

Andrei Iancu  
*Director of the United States Patent and Trademark Office*